(12) United States Patent
Jianhua et al.

(10) Patent No.: US 11,873,924 B2
(45) Date of Patent: Jan. 16, 2024

(54) THICK-WALL COMPRESSION FITTING

(71) Applicants: Guolin (Tianjin) Technology Co., Ltd., Tianjin (CN); Shanghai Zep International Trade Co., Ltd., Shanghai (CN)

(72) Inventors: Ye Jianhua, Tianjin (CN); Zhou Qingnian, Tianjin (CN)

(73) Assignees: Guolin (Tianjin) Technology Co., Ltd., Tianjin (CN); Shanghai Zep International Trade Co., Ltd., Shanghai (CN)

( * ) Notice: Subject to any disclaimer, the term of this patent is extended or adjusted under 35 U.S.C. 154(b) by 97 days.

(21) Appl. No.: 17/470,715

(22) Filed: Sep. 9, 2021

(65) Prior Publication Data

US 2022/0120364 A1    Apr. 21, 2022

(51) Int. Cl.
*F16L 37/091*   (2006.01)
*F16L 21/06*   (2006.01)
*F16L 21/00*   (2006.01)
*F16L 21/08*   (2006.01)

(52) U.S. Cl.
CPC .............. *F16L 21/06* (2013.01); *F16L 21/005* (2013.01); *F16L 21/08* (2013.01)

(58) Field of Classification Search
CPC ......... F16L 21/08; F16L 21/03; F16L 37/091; F16L 37/0925; F16L 37/098; F16L 37/12
See application file for complete search history.

(56) References Cited

U.S. PATENT DOCUMENTS

2020/0300395 A1*  9/2020  Paige .................... F16L 37/091

\* cited by examiner

*Primary Examiner* — Aaron M Dunwoody
(74) *Attorney, Agent, or Firm* — BENESCH, FRIEDLANDER, COPLAN & ARONOFF LL

(57) ABSTRACT

A thick-wall compression pipe fitting includes a thick-wall fitting body for connecting arranged between two thick-wall steel pipe bodies for connection, wherein a sealing ring, a positioning retainer and a teeth ring is disposed between said thick-wall fitting body and said thick-wall steel pipe bodies. Said thick-wall fitting body includes a middle connecting section, a first flared section and a second flared section extending to both sides to adopt a thick wall metal pipe. A special crimping tool is used to deform the fitting body for crimping to compress the socket section of the fitting body having a sealing ring and a high-strength teeth ring, so that the sealing ring in the socket section groove seals the steel pipe to stop leakage, wherein the high-strength teeth ring shrinks and firmly fastens the steel pipe so that the connection between the fitting body and the steel pipe can be completed instantly.

8 Claims, 12 Drawing Sheets

THICK-WALL COMPRESSION FITTING

CROSS REFERENCED TO RELATED APPLICATION

This application claims priority to and the benefit from Chinese Application No. 202011124020.1, titled "Thick-Wall Compression Fitting", filed on Oct. 20, 2020, the contents of which is herein incorporated by reference in its entirety.

TECHNICAL FIELD

The present application relates generally to the technical field of a compression fitting, in particular, a thick-wall compression fitting.

BACKGROUND

A pipeline is a device connected by pipes, pipe connectors and valves for conveying gas, liquid or fluid with solid particles. Generally, the fluid flows from the high-pressure part of the pipeline to the low-pressure part after being pressurized by blowers, compressors, pumps and boilers. It can also be transported by its own pressure or by gravity. Pipelines are widely used, mainly in water supply, drainage, heat supply, gas supply, long-distance transmission of oil and natural gas, agricultural irrigation, hydraulic engineering and various industrial devices, and the thick-wall compression fitting is one of the crimping pipeline systems, which is mainly used in water supply and drainage, fire protection system, gas, compressed air and other liquid and gas medium transmission.

At present, there are only thin-wall compression fittings, but for thick-wall fittings, traditional fluid transmission pipes are connected by fittings, and threaded connections are usually used between fittings to realize various pipeline systems. The installation efficiency of such threaded pipeline system is not high, and there are certain requirements for working space, and a series of problems such as leakage prevention at the connection have to be solved.

SUMMARY OF INVENTION

To solve the problems raised in the above background art, the present invention provides a thick-wall compression fitting to solve the above problems.

In order to achieve the above purpose, the present invention provides a technical solution as follows: a thick-wall compression fitting that is comprised of a thick-wall fitting body arranged between two thick-wall steel pipe bodies for connecting the thick-wall steel pipe bodies. A sealing ring, a positioning retainer and a teeth ring are installed between the thick-wall fitting body and the thick-wall steel pipe body. The thick-wall fitting body includes a middle connecting section and a first flared section and a second flared section extending to both sides. The connecting section, the first flared section and the second flared section are integrally formed, and a first limiting step is arranged between the connecting section and the first flared section and a second limiting step is arranged between the first flared section and the second flared section. The thick-wall steel pipe body extends into the inner side of the first flared section, and the end of the thick-wall steel pipe body is located at the first limiting step. The sealing ring, positioning retainer and the teeth ring are installed in the second flared section in consecutive sequential order, and the sealing ring is located at the second limiting step, the thick-wall steel pipe body and the thick-wall fitting body are sealed and connected with the sealing ring, the positioning retaining ring and the teeth ring, and the teeth ring is a "C" shaped snap ring having an elastic force of radial contraction.

Preferably, the side wall of the teeth ring is provided with positioning teeth projecting inward, and the positioning teeth are integrally formed with the teeth ring.

Preferably, with two positioning teeth as a group, multiple groups of the positioning teeth are equidistantly distributed along the length direction of the teeth ring, the two positioning teeth of each group are located on both sides of the centerline of the teeth ring, and the two positioning teeth of the same group are distributed in a staggered manner at an angle of 0~45°.

Preferably, with two positioning teeth as a group, multiple groups of the positioning teeth are equidistantly distributed along the length direction of the teeth ring, and the two positioning teeth of each group are located in the center of the teeth ring.

Preferably, with two positioning teeth as a group, multiple groups of the positioning teeth are equidistantly distributed along the length direction of the teeth ring, and the two positioning teeth of each group are located on the edge of the teeth ring respectively.

Preferably, there is a plurality of positioning teeth that are equidistantly distributed on the teeth ring, and a plurality of the positioning teeth are distributed in a staggered manner on both sides of the center line of the teeth ring.

Preferably, there is a plurality of positioning teeth that are equidistantly distributed on the teeth ring, and a plurality of the positioning teeth are distributed in a staggered manner on the edge of the two sides of the teeth ring.

Preferably, with two positioning teeth as a group, multiple groups of the positioning teeth are equidistantly distributed along the length direction of the teeth ring, the two positioning teeth of each group are located on the edge of the teeth ring, and the two positioning teeth of the same group are staggered at an angle of 0~45°.

Preferably, the end face of the thick-wall fitting body is provided with a retaining ring groove distributed symmetrically in the center.

Preferably, the end face of the thick-wall fitting body is provided with a symmetrically distributed ring entry groove.

Compared with the prior art, the beneficial effects of the present invention are:

In the present invention, a metal pipe with a thick wall is adopted, and a special crimping tool is used to deform the pipe body, so that the connection between the pipe body and the steel pipe can be completed instantly, and the crimping tool is used for crimping the socket section of the pipe body having a sealing ring and a high-strength gear ring, which are compressed at the same time so that the sealing ring in the socket section groove will be forced to stay close to the steel pipe for the purpose of sealing and stopping water; the high-strength gear ring shrinks and firmly fastens the steel pipe, achieving a very good tensile strength; due to the thick wall design, it has very good performances of pressure bearing and impact resistance.

In the present invention, the structure features simple construction and short construction time, and is free of threaded connection during connection, complex threading operation, high temperature, open fire, welding, oil pollution or welding slag pollution resulting from cutting or connection in the process of construction.

In the present invention, carbon steel is used as the base material, and the material cost is lower than that of stainless-steel fittings and copper fittings; the surface is treated with galvanization and EP anti-corrosion. Galvanization has good corrosion resistance, and EP has good corrosion resistance and weather resistance, and compared with ordinary galvanized steel pipes, double anti-corrosion brings stronger anti-corrosion and longer service life for pipe fittings.

Figure 1:
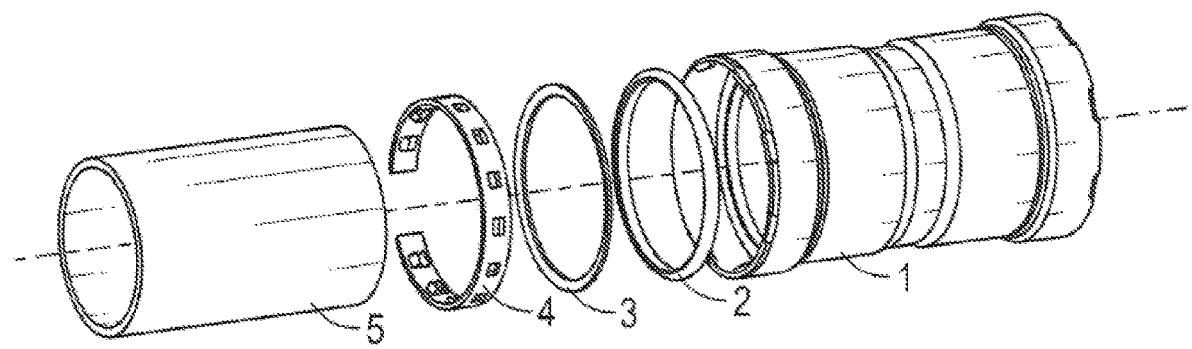
FIG. 1 is a structural diagram of the present invention.
Figure 2:
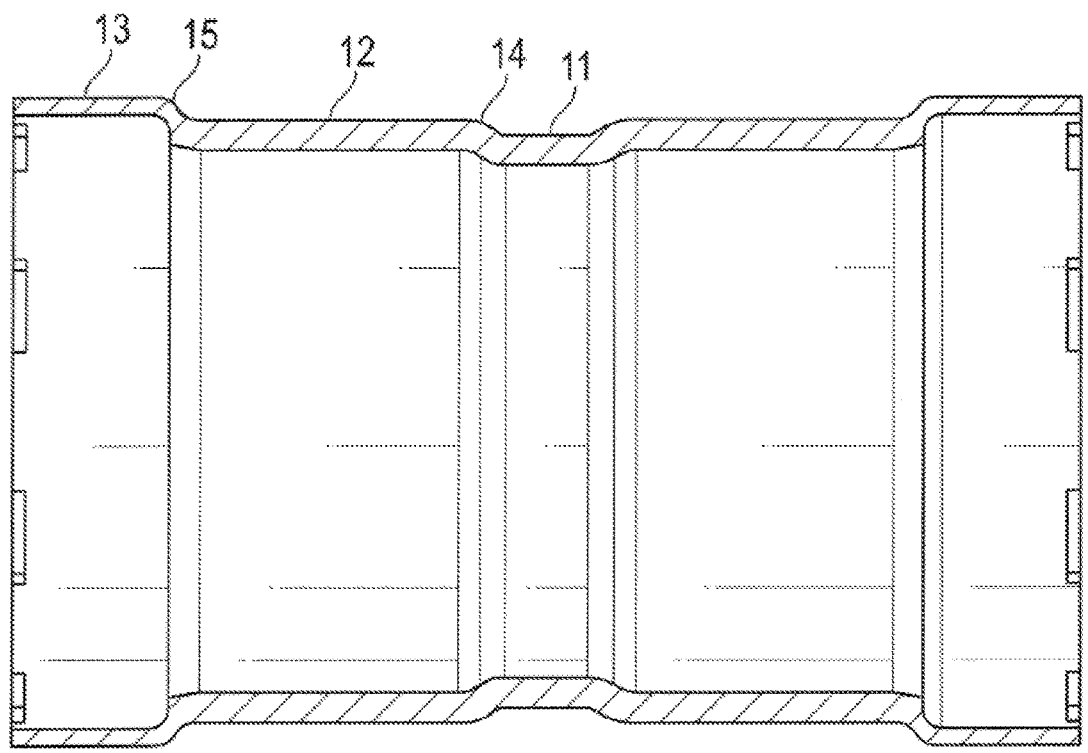
FIG. 2 is a sectional structural diagram of the thick-wall fitting body in the present invention.
Figure 3:
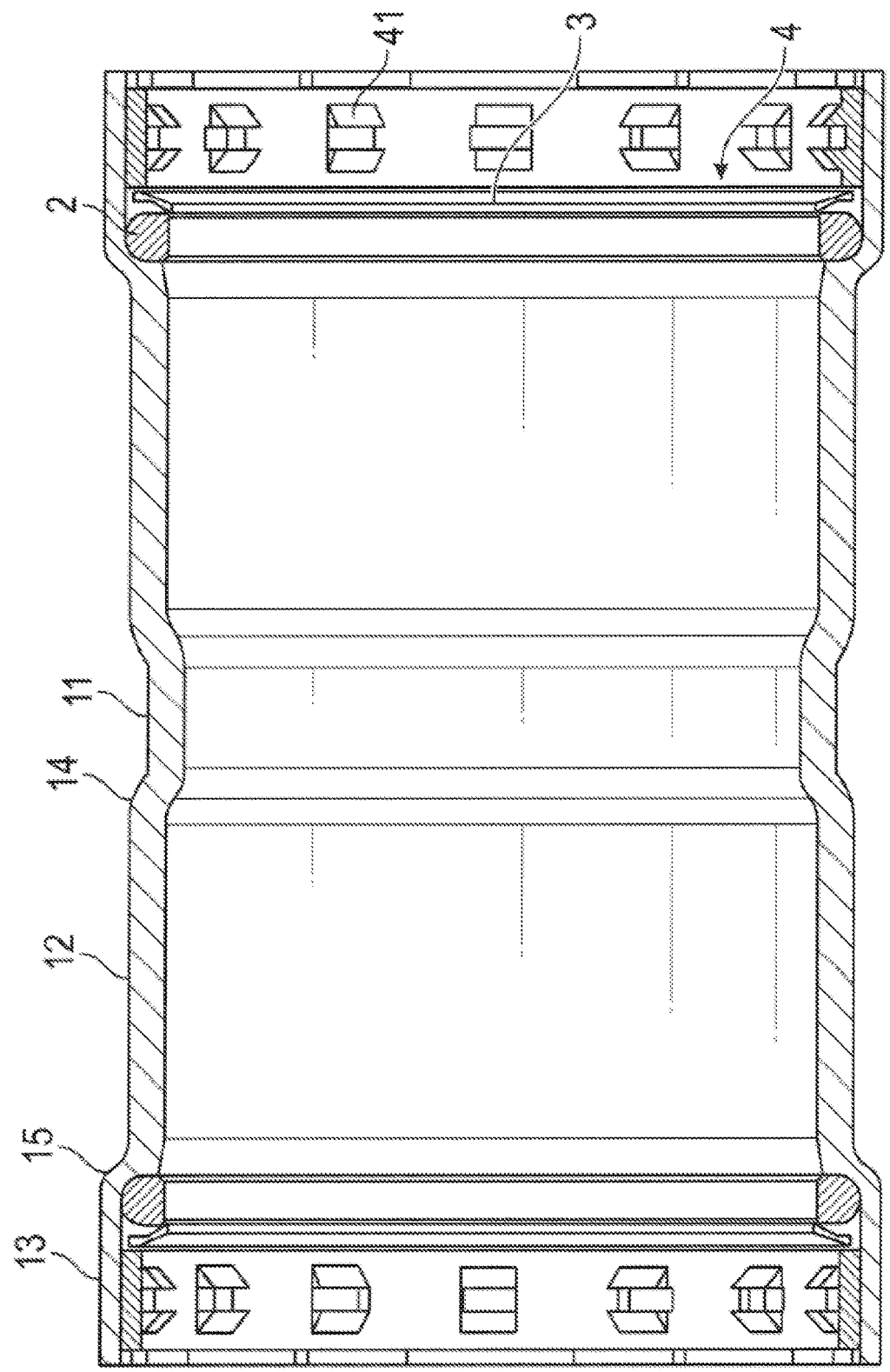
FIG. 3 is a structural diagram of assembly of the thick-wall fitting body in the present invention.
Figure 4:
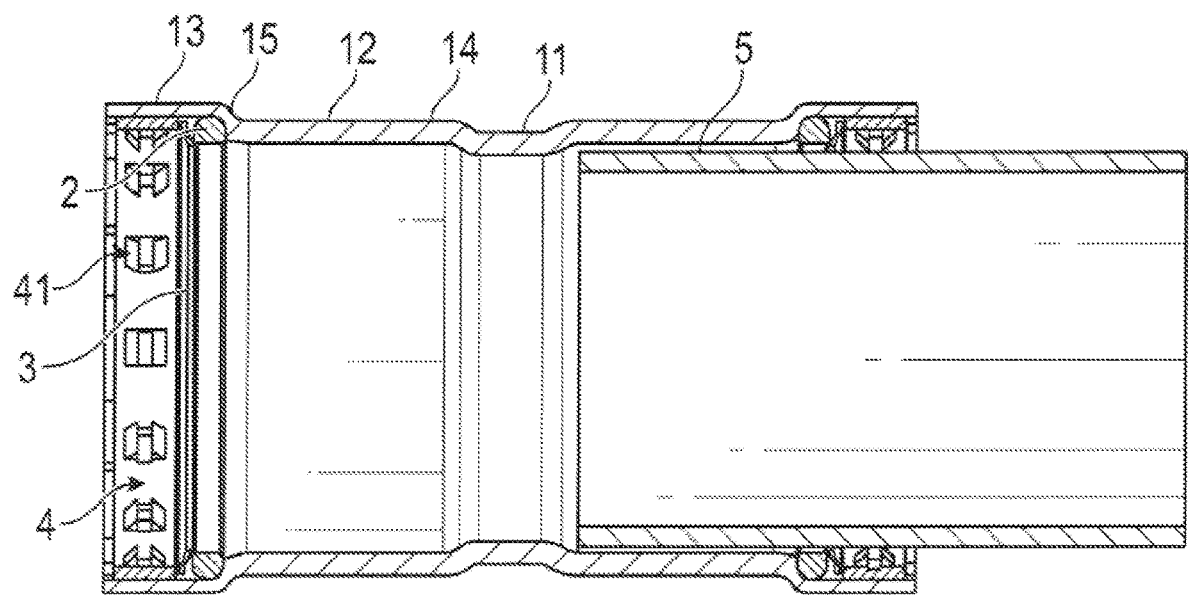
FIG. 4 is a structural diagram of the thick-wall fitting body in the invention before compression.
Figure 5:
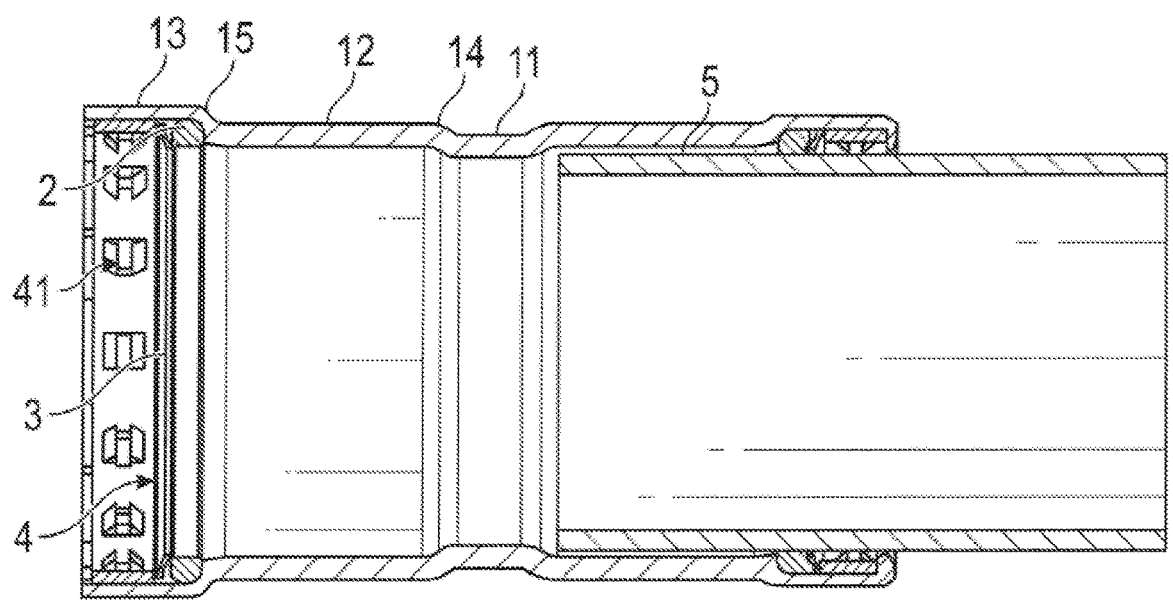
FIG. 5 is a structural diagram of the thick-wall fitting body in the invention after compression.

Reference designations in the figures are as follows: 1. Thick-wall fitting body; 11. Connecting section; 12. First flared section; 13. Second flared section; 14. First limiting step; 15. Second limiting step; 2. Sealing ring; 3. Positioning retainer; 4. Teeth ring; 41. Positioning teeth; 5. Thick-wall steel pipe body.

DETAILED DESCRIPTION

A clear and complete description of the technical solution in the embodiments of the present invention is given below by using the figures thereof; obviously, the described embodiments are only some of the embodiments of the present invention, not all of the embodiments. Based on the embodiments of the present invention, all other embodiments obtained by ordinary technicians in the art without creative labor shall belong to the scope of protection of the present invention.

Referring to FIG. 1-15, the present invention provides the following technical solution: a thick-wall compression fitting comprising a thick-wall fitting body 1 arranged between two thick-wall steel pipe bodies 5 for connecting the thick-wall steel pipe bodies 5. A sealing ring 2, a positioning retainer 3 and a teeth ring 4 are installed between the thick-wall fitting body 1 and the thick-wall steel pipe bodies 5. The thick-wall fitting body 1 includes a middle connecting section 11 and a first flared section 12 and a second flared section 13 extending to both sides. The connecting section 11, the first flared section 12 and the second flared section 13 are integrally formed, and a first limiting step 14 is arranged between the connecting section 11 and the first flared section 12 and a second limiting step 15 is arranged between the first flared section 12 and the second flared section 13. The thick-wall steel pipe bodies 15 extend into the inner side of the first flared section 12, and the end of the thick-wall steel pipe body 5 is located at the first limiting step 14. The sealing ring 2, the positioning retainer 3 and the teeth ring 4 are installed in the second flared section 13 in consecutive sequential order, and the sealing ring 2 is located at the second limiting step 15, the thick-wall steel pipe body 5 and the thick-wall fitting body 1 are sealed and connected with the sealing ring 2, the positioning retainer 3 and the teeth ring 4.

Figure 14:
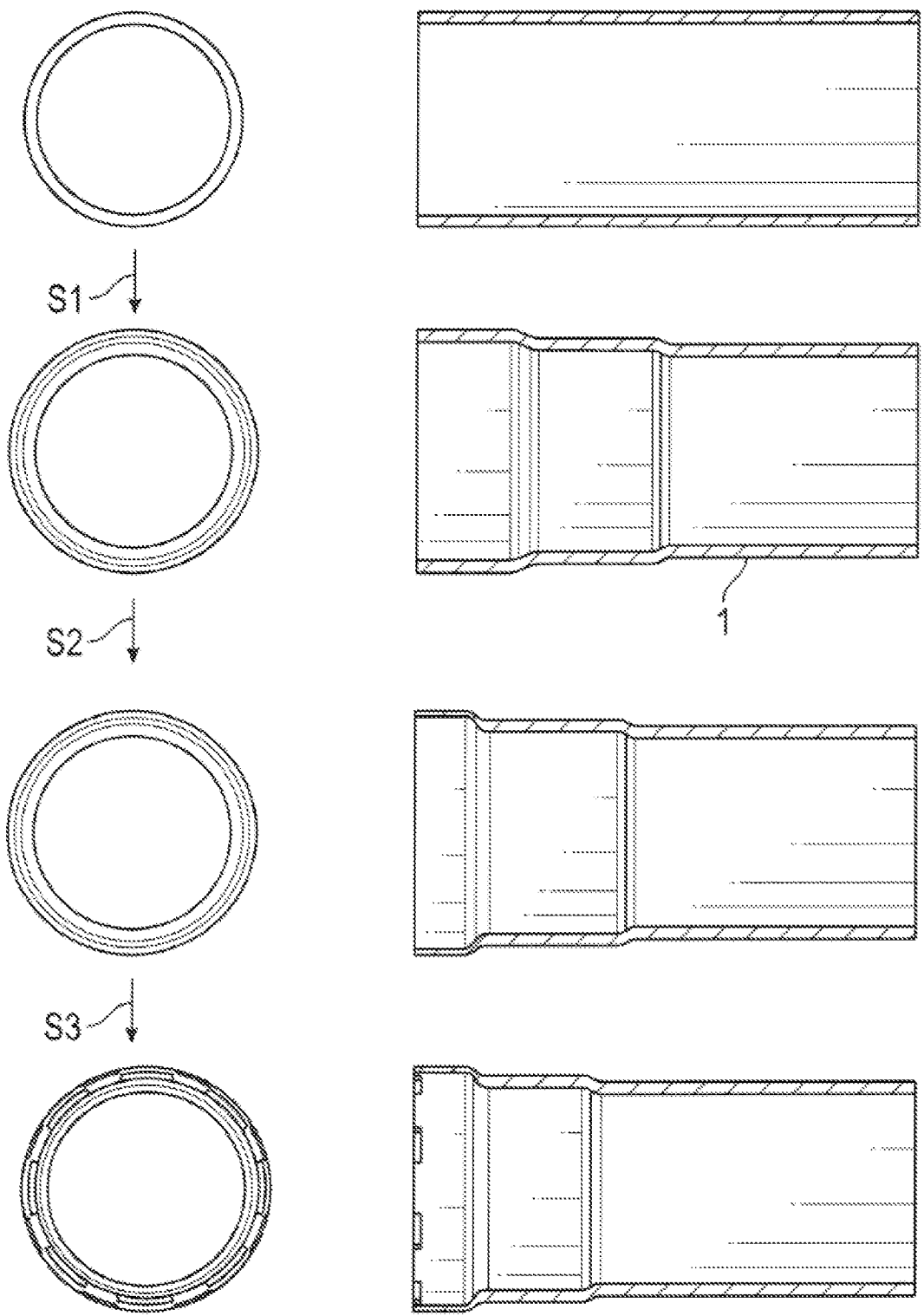
FIG. 14 is a schematic diagram of the processing steps for the end face of the first type of thick-wall fitting as shown in FIG. 6.

As shown in FIG. 14, a first method for processing an end face of a thick-wall fitting body includes the following steps:

Step S1: flaring both ends of the thick-wall pipe with flaring equipment to form the first flared section 12, and then flaring again with flaring equipment on the basis of the first flaring section 12 to form the second flared section 13;

Step S2: machining the end face of the second flared section 13;

Step S3: a retaining ring groove distributed symmetrically in the center is formed on the end face of the second flared section 13.

Figure 15:
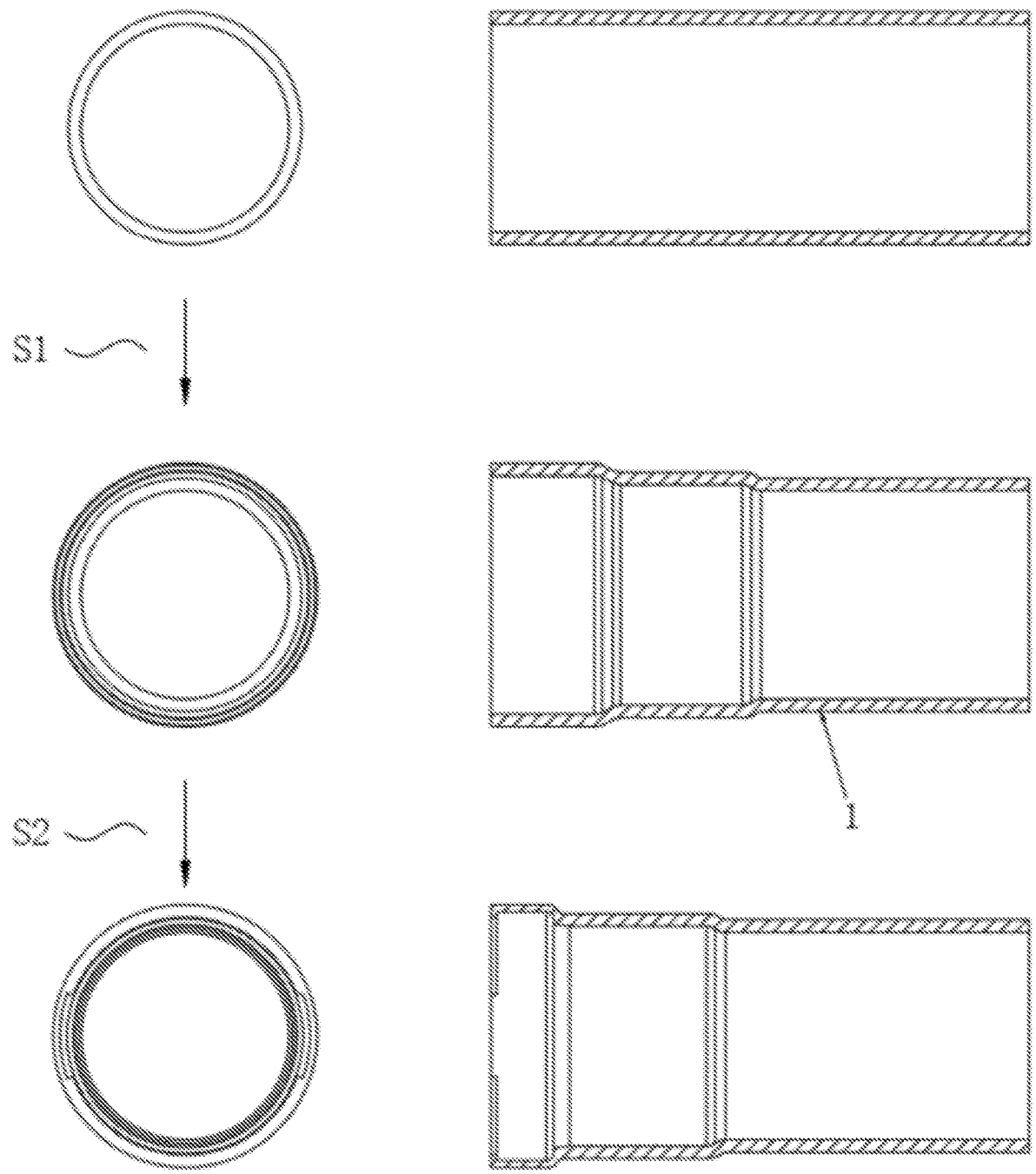
FIG. 15 is a schematic diagram of the processing steps for the end face of the second type of thick-wall fitting as shown in FIG. 7.

As shown in FIG. 15, the second method for processing the end face of the thick-wall fitting body includes the following steps:

Step S1: flaring both ends of the thick-wall pipe with flaring equipment to form the first flared section 12, and then flare again with flaring equipment on the basis of the first flared section 12 to form the second flared section 13;

Step S2: machining the end face of the second flared section 13 to form a symmetrically distributed ring entry groove on the end face.

In this embodiment, the thick-wall fitting body 1 comprises a middle connecting section 11 as well as a first flared section 12 and a second flared section 13 extending to both sides. The thick-wall steel pipe body 5 extends into the inner side of the first flared section 12, and the end of the thick-wall steel pipe body 5 is located at the first limiting step 14. The sealing ring 2, the positioning retainer 3 and the teeth ring 4 are installed in the second flared section 13 in consecutive sequential order, and the sealing ring 2 is located at the second limiting step 15. After the thick-wall steel pipe body 5 is installed, compression equipment can be used to squeeze the second flared section 13 to the inside for collapsing the second flared section 13, so as to squeeze the sealing ring 2, the positioning retainer 3 and the teeth ring 4 to fit between the thick-wall steel pipe body 5 and the second flared section 13 to ensure tightness and stability. In this connection structure, a special crimping tool is used to deform the thick-wall fitting 1, so that the connection between the thick-wall fitting 1 and the thick-wall steel pipe body 5 can be completed instantly, and the crimping tool is used for crimping the second flared section 12 (the socket section) of the fitting having a sealing ring 2 and a high-strength teeth ring 4, which are compressed at the same time so that the sealing ring 2 in the second flared section 12 (the socket section) will be forced to stay close to the thick-wall steel pipe body 5 for the purpose of sealing and stopping water; the high-strength teeth ring 4 shrinks and firmly fastens the thick-wall steel pipe body 5, achieving a very good tensile strength; due to the thick wall design, it has very good performances of pressure bearing and impact resistance. The structure features simple construction and short construction time, and is free of threaded connection during connection, complex threading operation, high temperature, open fire, welding, oil pollution or welding slag pollution resulting from cutting or connection in the process of construction. For the thick-wall fitting body 1, carbon steel is used as the base material, and the material cost is lower than that of stainless-steel fittings and copper fittings; the surface is treated with galvanization and EP anti-corrosion. Galvanization has good corrosion resistance, and EP has good corrosion resistance and weather resistance, when compared with ordinary galvanized steel pipes, double anti-corrosion brings stronger anti-corrosion and longer service life for pipe fittings.

Specifically, as shown in FIG. 8-12, the teeth ring 4 is a "C" shaped snap ring, which has an elasticity of radial contraction. The side wall of the teeth ring 4 is provided with positioning teeth 41, which protrudes inward.

The positioning teeth 41 are integrally formed with the teeth ring 4, so that the teeth ring 4 has the ability of radial contraction, so as to ensure the shrinkage during crimping, which will shrink the high-strength teeth ring 4, making it firmly fasten the thick-wall steel pipe body 5, achieving a very good tensile strength.

Figure 8:
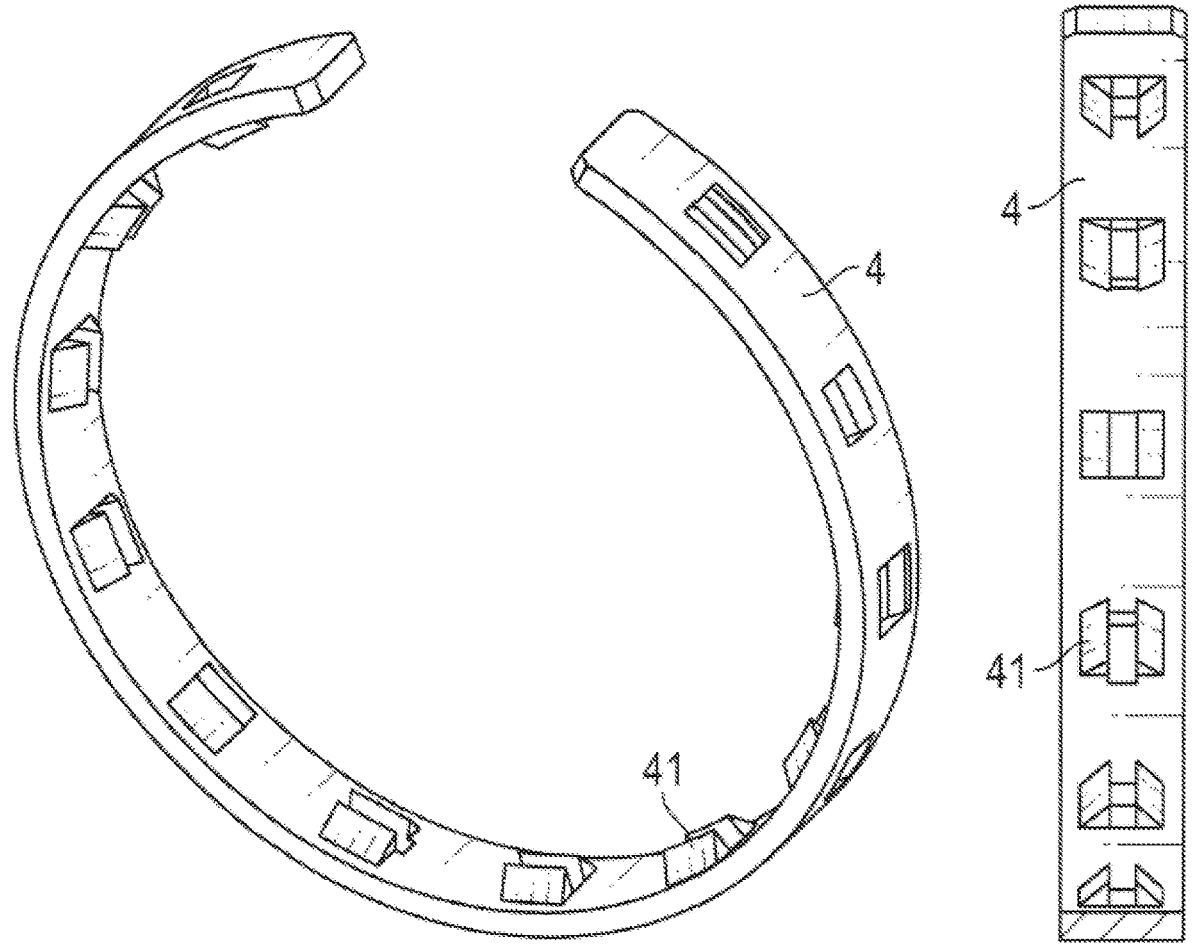
FIG. 8 is a structural diagram of the teeth ring in the present invention.

Specifically, as shown in FIG. 8, with two positioning teeth 41 as a group, multiple groups of the positioning teeth 41 are equidistantly distributed along the length direction of the teeth ring 4, and the two positioning teeth 41 of each group are located on the two sides of the centerline of the teeth ring 4. By symmetrically setting two groups of positioning teeth 41 on the center line of the teeth ring 4, the tightness of connection with the thick-wall steel pipe body 5 after compression can be increased.

Figure 9:
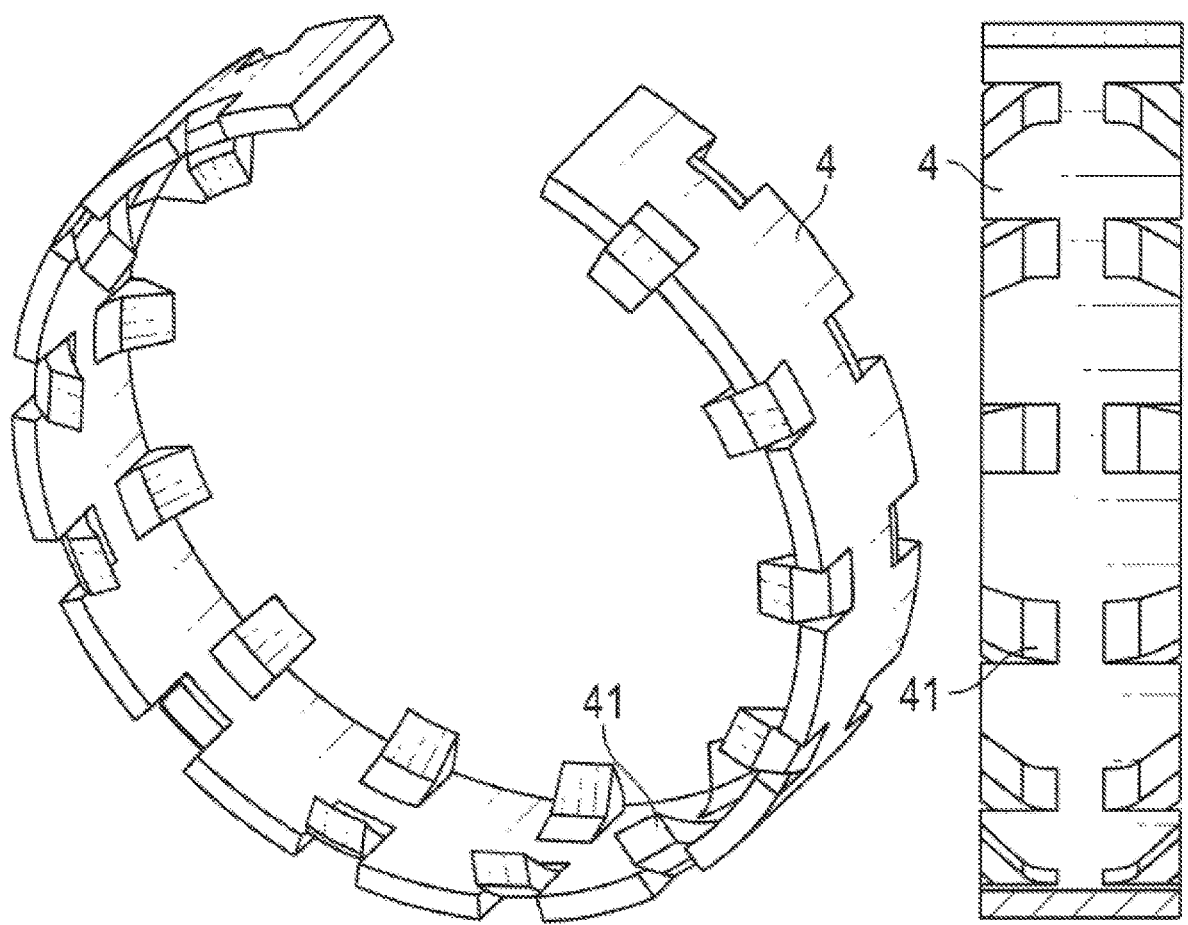
FIG. 9 is another structural diagram of the teeth ring in the present invention.

Specifically, as shown in FIG. 9, with two positioning teeth 41 as a group, multiple groups of the positioning teeth 41 are equidistantly distributed along the length direction of the teeth ring 4, and the two positioning teeth 41 of each group are located on the edge of the teeth ring 4 respectively. By setting two groups of positioning teeth 41 on the edge, the length of the connection is increased and the tightness of the connection is ensured.

Figure 10:
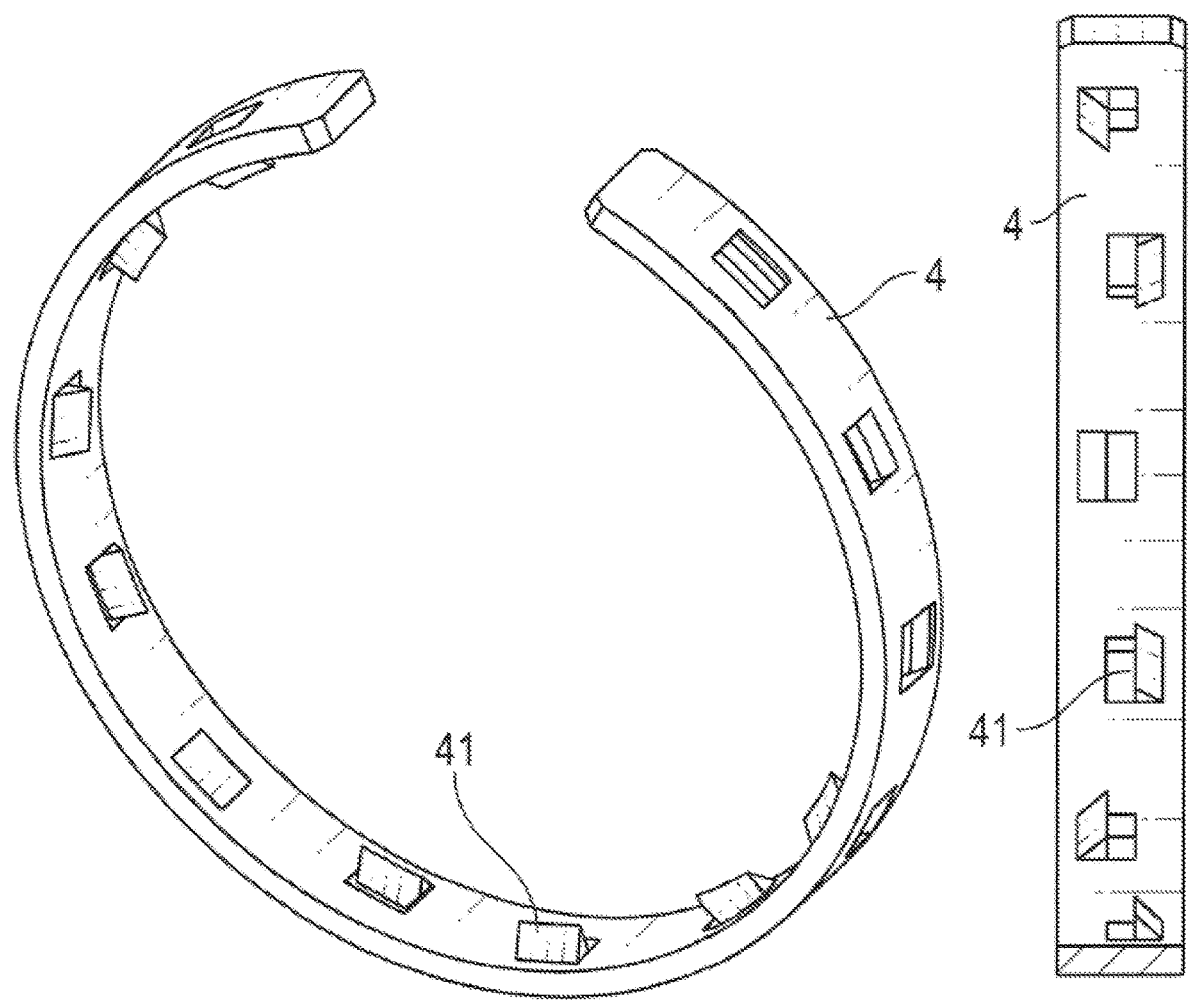
FIG. 10 is yet another structural diagram of the teeth ring in the present invention.

Specifically, as shown in FIG. 10, there is a plurality of positioning teeth 41 that are equidistantly distributed on the teeth ring 4, and a plurality of the positioning teeth 41 are distributed in a staggered manner on the two sides of the center line of the teeth ring 4. By arranging the distributed positioning teeth 41 in a staggered manner, the stability of connection with the thick-wall steel pipe body 5 is enhanced.

Figure 11:
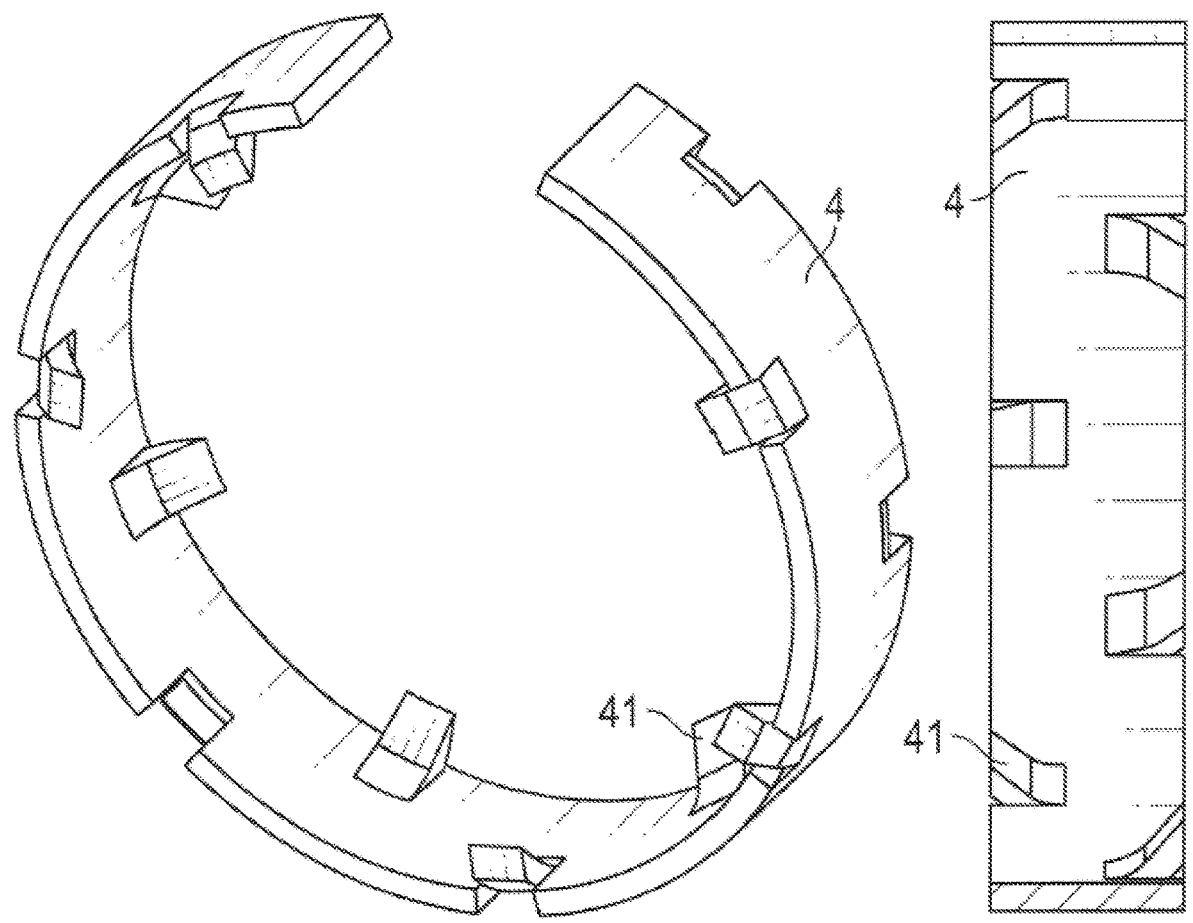
FIG. 11 is further another structural diagram of the teeth ring in the present invention.

Specifically, as shown in FIG. 11, there is a plurality of positioning teeth 41, which are equidistantly distributed on the teeth ring 4, and a plurality of positioning teeth 41 are distributed in a staggered manner on the two sides of the teeth ring 4 to enhance the stability of connection with the thick-wall steel pipe body 5.

Figure 12:
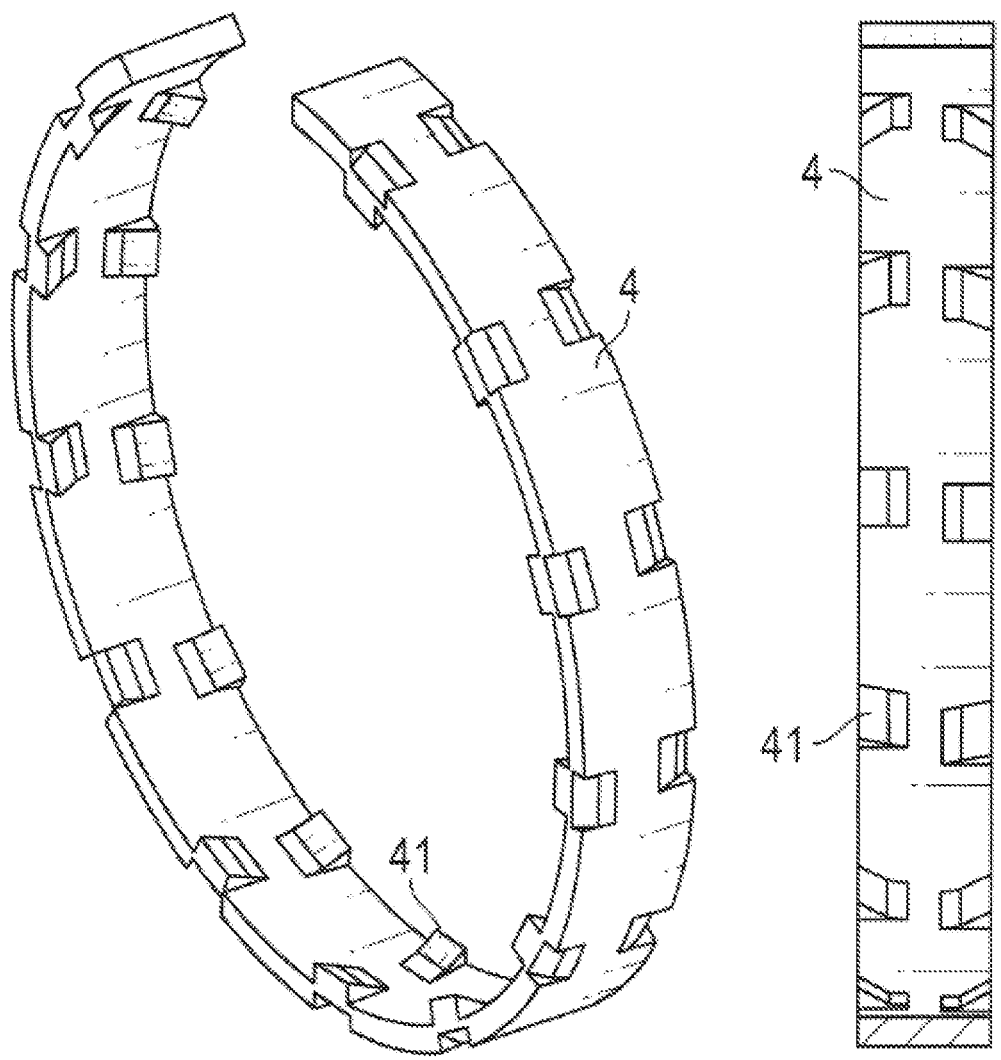
FIG. 12 is another schematic diagram of the toothed ring in the present invention.

Specifically, as shown in FIG. 12, with two positioning teeth 41 as a group, multiple groups of the positioning teeth 41 are equidistantly distributed along the length direction of the teeth ring 4, and the two positioning teeth 41 of each group are located on the edge of the teeth ring 4 respectively and the two positioning teeth 41 of the same group are distributed in a staggered manner at an angle of 0~45°. By setting two groups of positioning teeth 41 on the edge, the length of the connection is increased and the tightness of the connection is ensured.

Figure 13:
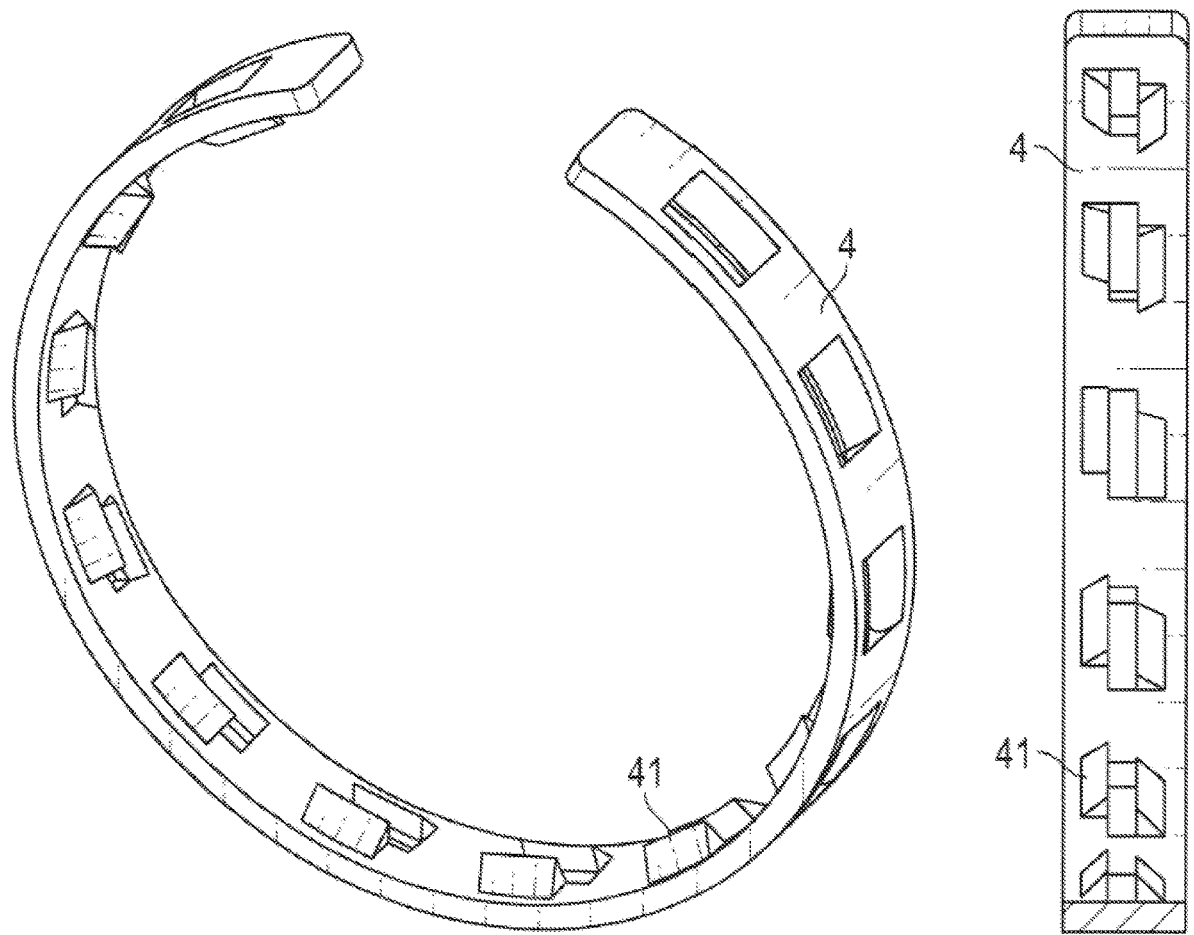
FIG. 13 is yet another structural diagram of the toothed ring in the present invention.

Specifically, as shown in FIG. 13, with two positioning teeth 41 as a group, multiple groups of the positioning teeth 41 are equidistantly distributed along the length direction of the teeth ring 4, and the two positioning teeth 41 of each group are located on the two sides of the center line of the teeth ring 4 respectively, and the two positioning teeth 41 of the same group are distributed in a staggered manner at an angle of 0~45°. By setting two groups of positioning teeth 41 on the two sides of the center line, the length of the connection is increased, and the tightness of the connection is ensured.

Figure 6:
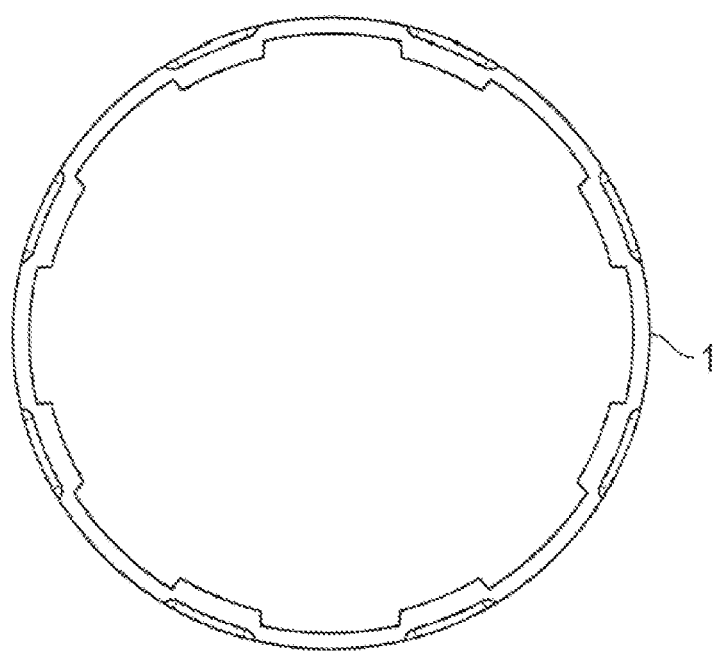
FIG. 6 is a first structural diagram of the end face of the thick-wall fitting body in the present invention.

Specifically, as shown in FIG. 6, the end face of the thick-wall fitting body 1 is provided with a retaining ring groove distributed symmetrically in the center, and the end face is extruded into a plurality of retaining ring structures, which can enhance the tightness of connection with the thick-wall steel pipe body 5.

Figure 7:
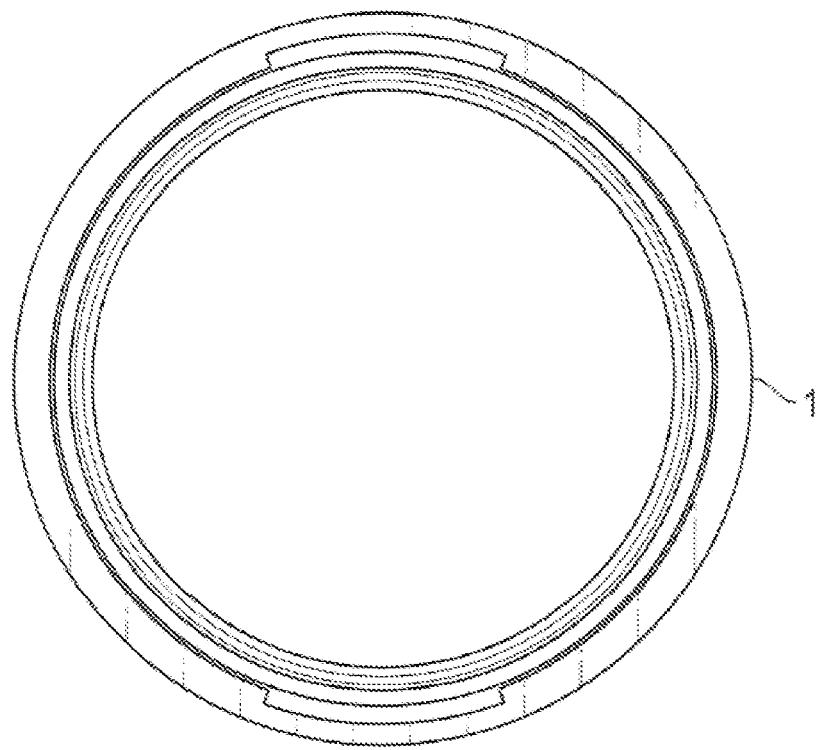
FIG. 7 is a second structural diagram of the end face of the thick-wall fitting body in the present invention.

Specifically, as shown in FIG. 7, the end face of the thick-wall fitting body 1 is provided with a symmetrically distributed ring entry groove to facilitate the shrinkage and collapse of the second flared section 13 of the thick-wall fitting body 1.

The working principle and application process of the present invention: the thick-wall steel pipe body 5 extends into the inner side of the first flared section 12, and the end of the thick-wall steel pipe body 5 is located at the first limiting step 14. The sealing ring 2, the positioning retainer 3 and the teeth ring 4 are installed in the second flared section 13 in consecutive sequential order, and the sealing ring 2 is located at the second limiting step 15. After the thick-wall steel pipe body 5 is installed, compression equipment can be used to squeeze the second flared section 13 to the inside for collapsing the second flared section 13, so as to squeeze the sealing ring 2, the positioning retainer 3 and the teeth ring 4 to fit between the thick-wall steel pipe body 5 and the second flared section 13 to ensure tightness and stability. In this connection structure, a special crimping tool is used to deform the thick-wall fitting 1, so that the connection between the thick-wall fitting 1 and the thick-wall steel pipe body 5 can be completed instantly, and the crimping tool is used for crimping the second flared section 12 (the socket section) of the fitting having a sealing ring 2 and a high-strength teeth ring 4, which are compressed at the same time so that the sealing ring 2 in the second flared section 12 (the socket section) will be forced to stay close to the thick-wall steel pipe body 5 for the purpose of sealing and stopping water; the high-strength teeth ring 4 shrinks and firmly fastens the thick-wall steel pipe body 5, achieving a very good tensile strength; due to the thick wall design, it has very good performances of pressure bearing and impact resistance. The structure features simple construction and short construction time, and is free of threaded connection during connection, complex threading operation, high temperature, open fire, welding, oil pollution or welding slag pollution resulting from cutting or connection in the process of construction. For the thick-wall fitting body 1, carbon steel is used as the base material, and the material cost is lower than that of stainless-steel fittings and copper fittings; the surface is treated with galvanization and EP anti-corrosion. Galvanization has good corrosion resistance, and EP has good corrosion resistance and weather resistance, and compared with ordinary galvanized steel pipes, double anti-corrosion brings stronger anti-corrosion and longer service life for pipe fittings.

Finally, it should be noted that the above are only the preferred embodiments of the present invention and are not used to limit the invention. Although the invention is described in detail with reference to the above embodiments, those skilled in the art can still modify the technical solutions set forth in the above embodiments or carry out equivalent replacements in relation to some of the technical features. Any modification, equivalent replacement, improvement, etc. made within the spirit and principles of the present invention shall be included in the protection scope of the present invention.

What is claimed is:

1. A thick-wall compression pipe fitting, comprising:
   a thick-wall fitting body arranged between two thick-wall steel pipe bodies for connecting the thick-wall steel pipe bodies; and
   a sealing ring, a positioning retainer and a teeth ring installed between the thick-wall fitting body and the thick-wall steel pipe body, wherein
   said thick-wall fitting body includes a middle connecting section and a first flared section and a second flared section extending to both sides;
   said connecting section, the first flared section and the second flared section are integrally formed, and a first limiting step is arranged between the connecting section and the first flared section and a second limiting step is arranged between the first flared section and the second flared section;
   the thick-wall steel pipe body extends into the inner side of the first flared section, and the end of the thick-wall steel pipe body is located at the first limiting step;
   the sealing ring, the positioning retainer and the teeth ring are installed in the second flared section in sequence, wherein the sealing ring is located at the second limiting step, the thick-wall steel pipe body and the thick-wall fitting body are sealed and connected with the sealing ring, the positioning retaining ring and the teeth ring;
   the teeth ring is a "C" shaped snap ring having an elastic force of radial contraction; and
   a side wall of the teeth ring is provided with positioning teeth projecting inward, and the positioning teeth are integrally formed with the teeth ring, wherein with two positioning teeth as a group, multiple groups of the positioning teeth are equidistantly distributed along the length direction of the teeth ring, the two positioning teeth of each group are located on the edge of the teeth ring respectively, and the two positioning teeth of the same group are distributed in a staggered manner at an angle of 0~45°.

2. The thick-wall compression pipe fitting according to claim 1, wherein an end face of the thick-wall fitting body is provided with a retaining ring groove distributed symmetrically in the center.

3. A thick-wall compression pipe fitting, comprising:
   a thick-wall fitting body arranged between two thick-wall steel pipe bodies for connecting the thick-wall steel pipe bodies;
   a sealing ring, a positioning retainer and a teeth ring installed between the thick-wall fitting body and the thick-wall steel pipe body, wherein
   said thick-wall fitting body includes a middle connecting section and a first flared section and a second flared section extending to both sides;
   said connecting section, the first flared section and the second flared section are integrally formed, and a first limiting step is arranged between the connecting section and the first flared section and a second limiting step is arranged between the first flared section and the second flared section;
   the thick-wall steel pipe body extends into the inner side of the first flared section, and the end of the thick-wall steel pipe body is located at the first limiting step;
   the sealing ring, the positioning retainer and the teeth ring are installed in the second flared section in sequence, wherein the sealing ring is located at the second limiting step, the thick-wall steel pipe body and the thick-wall fitting body are sealed and connected with the sealing ring, the positioning retaining ring and the teeth ring;
   the teeth ring is a "C" shaped snap ring having an elastic force of radial contraction, a side wall of the teeth ring is provided with positioning teeth projecting inward, and the positioning teeth are integrally formed with the teeth ring, and with two positioning teeth as a group, multiple groups of the positioning teeth are equidistantly distributed along a length direction of the teeth ring, the two positioning teeth of each group are located on both sides of a centerline of the teeth ring, and the two positioning teeth of the same group are distributed in a staggered manner at an angle of 0~45°; and
   an end face of the thick-wall fitting body is provided with a retaining ring groove distributed symmetrically in the center.

4. The thick-wall compression fitting pipe according to claim 3, wherein the end face of the thick-wall fitting body is provided with a symmetrically distributed ring entry groove.

5. The thick-wall compression pipe fitting according to claim 3 is characterized in that with two positioning teeth as a group, multiple groups of the positioning teeth are equidistantly distributed along the length direction of the teeth ring, the two positioning teeth of each group are located on both sides of the centerline of the teeth ring, and the two positioning teeth of the same group are located in the center of the teeth ring.

6. The thick-wall compression pipe fitting according to claim 3 is characterized in that there are a plurality of positioning teeth that are equidistantly distributed on the teeth ring in a staggered manner on both sides of the center line of the teeth ring.

7. The thick-wall compression pipe fitting according to claim 3 is characterized in that there are a plurality of positioning teeth that are equidistantly distributed on the teeth ring in a staggered manner on the edge of the two sides of the teeth ring.

8. The thick-wall compression pipe fitting as described in claim 3 is characterized in that with two positioning teeth as a group, multiple groups of the positioning teeth are equidistantly distributed along the length direction of the teeth ring, the two positioning teeth of each group are located on the edge of the teeth ring respectively.

* * * * *